(12) United States Patent
Yim

(10) Patent No.: US 8,544,643 B2
(45) Date of Patent: Oct. 1, 2013

(54) WATERPROOF CAMERA CASE WITH A LOCK MECHANISM

(75) Inventor: Wai Lam William Yim, Hong Kong (HK)

(73) Assignee: Zear Corporation Limited, Hong Kong (HK)

( * ) Notice: Subject to any disclaimer, the term of this patent is extended or adjusted under 35 U.S.C. 154(b) by 715 days.

(21) Appl. No.: 12/643,994

(22) Filed: Dec. 21, 2009

(65) Prior Publication Data

US 2011/0147245 A1 Jun. 23, 2011

(51) Int. Cl.
*B65D 85/30* (2006.01)
(52) U.S. Cl.
USPC ............. 206/316.2; 396/25; 396/27; 292/256
(58) Field of Classification Search
USPC ...................... 206/305, 316.1–316.3; 396/25, 396/27; 292/247, 163, 256, DIG. 11, DIG. 50, 292/DIG. 42, 137
See application file for complete search history.

(56) References Cited

U.S. PATENT DOCUMENTS

| 7,060,921 | B2 * | 6/2006 | Kubo ........................... 200/302.1 |
| 7,370,891 | B1 * | 5/2008 | Schmitt et al. ................ 292/113 |
| 7,801,425 | B2 * | 9/2010 | Fantone et al. ................. 396/27 |
| 2002/0162841 | A1 * | 11/2002 | Shamir et al. ................. 220/326 |
| 2009/0032420 | A1 * | 2/2009 | Zenzai ........................ 206/316.2 |
| 2009/0058102 | A1 * | 3/2009 | Garneau et al. ............... 292/163 |

* cited by examiner

*Primary Examiner* — J. Gregory Pickett
*Assistant Examiner* — Robert Poon

(57) ABSTRACT

A waterproof camera case includes first and second case members and a lock mechanism for locking the first and second case members together. The lock mechanism includes a side flip hingedly connected to a side of the rear case member and moveable between a flip open position and a flip closed position where an inner surface of the side flip abuts against a side of the front case member. A press member is pivotable about a first shaft mounted on the inner surface of the side flip and moveable between a non-pressing position and a pressing position. A free distal side of the press member is configured to press against a ledge projected from the side of the front case member on a surface oppositely facing the rear case member. A lock member is slidable along a second shaft mounted on the inner surface of the side flip and moveable between an unlocked position and a locked position. The lock member has a latch portion adapted to insert into a slot defined by a catch portion formed on the side of the front case member. A torsion spring is used to bias the press member in the non-pressing position, and a compression spring is used to bias the lock member in the locked position.

10 Claims, 7 Drawing Sheets

WATERPROOF CAMERA CASE WITH A LOCK MECHANISM

FIELD OF PATENT APPLICATION

The present patent application relates to waterproof camera case with a lock mechanism.

BACKGROUND

A waterproof camera case is used to protect a camera from water damaging the electronic, mechanical and optical parts inside the camera. It can also protect the camera against dust, sand and dirt. It can submerge into water at a depth of up to 40 meters. It is suitable for most water sports and activities e.g. swimming, surfing, wind surfing, water skating, yachting, snorkeling, water diving or under rain/snow photo taking.

The waterproof camera case may include a front housing and a rear housing. The front housing of the waterproof camera case is configured to receive therein a camera. The rear housing is employed to cover the opening of the front housing. A gasket can be secured in between the coupling edges of the front housing and the rear housing in order to seal the camera case in a waterproof condition. A lock mechanism is required to lock the front housing and the rear housing together. Existing lock mechanisms for waterproof camera cases may not effectively lock the front housing and the rear housing together in a desired waterproof condition.

There is a need to produce an improved lock mechanism for these waterproof camera cases.

SUMMARY

According to one aspect, there is provided a lock mechanism for a waterproof camera case having a front case member and a rear case member. The lock mechanism includes:
- a side flip hingedly connected to a side of the rear case member and moveable between a flip open position and a flip closed position where an inner surface of the side flip abuts against a side of the front case member;
- a press member pivotable about a first shaft mounted on the inner surface of the side flip and moveable between a non-pressing position and a pressing position, a free distal side of the pivotable press member being configured to press against a ledge projected from the side of the front case member on a surface oppositely facing the rear case member thereby pressing the front case member against the rear case member when the side flip moves towards the flip closed position and the press member pivots towards the inner surface of the side flip;
- a torsion spring coupled to the first shaft for biasing the press member in the non-pressing position at an acute angle with respect to the side flip;
- a lock member slidable along a second shaft mounted on the inner surface of the side flip and moveable between an unlocked position and a locked position, the lock member having a latch portion adapted to insert into a slot defined by a catch portion formed on the side of the front case member thereby locking the side flip in the flip closed position; and
- a compression spring mounted coaxially around the second shaft for biasing the lock member in the locked position.

In one embodiment, the press member is generally in the shape of an elongated rectangular bar, and the free distal side of the press member is elongated in shape for pressing against an elongated groove formed on the ledge.

In one embodiment, the elongated free distal side has a convex cross section, and the elongated groove has a complementary concave cross section.

In one embodiment, the ledge is integrally formed proximate to and along the coupling edge of the front case member.

In one embodiment, the latch portion has a first curved surface for engagement with a second curved surface on the catch portion, whereby when the side flip is moved from the flip open position towards the flip closed position, the first curved surface presses against the second curved surface thereby forcing the lock member to move towards the unlocked position until the latch portion passes the catch portion and inserts into the slot when the lock member is pushed from the unlocked position to the locked position under the influence of the compression force of the compression spring.

In one embodiment, the first shaft is parallel to a pivot axis about which the side flip pivots with respect to the rear case member.

In one embodiment, the first and second shafts are parallel to each other.

In one embodiment, the lock mechanism further includes a switch portion integrally formed on the lock member and extended outwardly through an opening of the side flip for manually switching the lock member from the locked position to the unlocked position thereby releasing the side flip from the flip closed position.

In one embodiment, the side flip is hingedly connected to one side of the rear case member opposite to the side of the rear case member which is hingedly connected to the front case member.

In one embodiment, the width of the side flip is substantially equal to the width of the side of the front case member.

According to another aspect, there is provided a waterproof camera case including first and second case members and a lock mechanism for locking the first and second case members together. The lock mechanism includes:
- a side flip hingedly connected to a side of the first case member and moveable between a flip open position and a flip closed position where an inner surface of the side flip abuts against a side of the second case member;
- a press member pivotable about a first shaft mounted on the inner surface of the side flip and moveable between a non-pressing position and a pressing position, a free distal side of the press member being configured to press against a ledge projected from the side of the second case member on a surface oppositely facing first case member; and
- a lock member slidable along a second shaft mounted on the inner surface of the side flip and moveable between an unlocked position and a locked position, the lock member having a latch portion adapted to insert into a cavity defined by a catch portion formed on the side of the second case member.

In one embodiment, the lock mechanism further includes a torsion spring coupled to the first shaft for biasing the press member in the non-pressing position at an acute angle with respect to the side flip.

In one embodiment, the lock mechanism further includes a compression spring mounted on the second shaft for biasing the lock member in the locked position.

In one embodiment, the press member is generally in the shape of an elongated rectangular bar, and the free distal side of the press member is elongated in shape for pressing against an elongated groove formed on the ledge.

In one embodiment, the elongated free distal side has a convex cross section, and the elongated groove has a complementary concave cross section.

In one embodiment, the ledge is integrally formed proximate to and along an edge of the front case member.

In one embodiment, the latch portion has a first curved surface for engagement with a second curved surface on the catch portion, whereby when the side flip is moved from the flip open position towards the flip closed position, the first curved surface presses against the second curved surface thereby forcing the lock member to move towards the unlocked position until the latch portion passes the catch portion and inserts into the cavity when the lock member is pushed from the unlocked position to the locked position under the influence of the compression force of the compression spring.

In one embodiment, the lock mechanism further includes a switch portion integrally formed on the lock member and disposed generally through an opening of the side flip for manually switching the lock member from the locked position to the unlocked position thereby releasing the side flip from the flip closed position.

In one embodiment, the first shaft is parallel to a pivot axis about which the side flip pivots with respect to the first case member.

In one embodiment, the first and second shafts are parallel to each other.

In one embodiment, the side flip is hingedly connected to one side of the first case member opposite to the side of the first case member which is hingedly connected to the second case member.

In one embodiment, the width of the side flip is substantially equal to the width of the side of the second case member.

Although the lock mechanism of a waterproof camera case disclosed in the present application is shown and described with respect to certain embodiments, it is obvious that equivalents and modifications will occur to others skilled in the art upon the reading and understanding of the specification. The present application includes all such equivalents and modifications, and is limited only by the scope of the claims.

BRIEF DESCRIPTION OF THE DRAWINGS

Specific embodiments of the lock mechanism of a waterproof camera case disclosed in the present application will now be described by way of example with reference to the accompanying drawings wherein.

DETAILED DESCRIPTION

Reference will now be made in detail to a preferred embodiment of the waterproof camera case with a lock mechanism disclosed in the present application, examples of which are also provided in the following description. Exemplary embodiments disclosed in the present application are described in detail, although it will be apparent to those skilled in the relevant art that some features that are not particularly important to an understanding of the waterproof camera case with a lock mechanism may not be shown for the sake of clarity.

Furthermore, it should be understood that the waterproof camera case with a lock mechanism disclosed in the present application is not limited to the precise embodiments described below and that various changes and modifications thereof may be effected by one skilled in the art without departing from the spirit or scope of the appended claims. For example, elements and/or features of different illustrative embodiments may be combined with each other and/or substituted for each other within the scope of this disclosure and appended claims.

In addition, improvements and modifications which may become apparent to persons of ordinary skill in the art after reading this disclosure, the drawings, and the appended claims are deemed within the spirit and scope of the appended claims.

It should be noted that throughout the specification and claims herein, when one element is said to be "coupled" or "connected" to another, this does not necessarily mean that one element is fastened, secured, or otherwise attached to another element. Instead, the term "coupled" or "connected" means that one element is either connected directly or indirectly to another element, or is in mechanical or electrical communication with another element.

Figure 1:
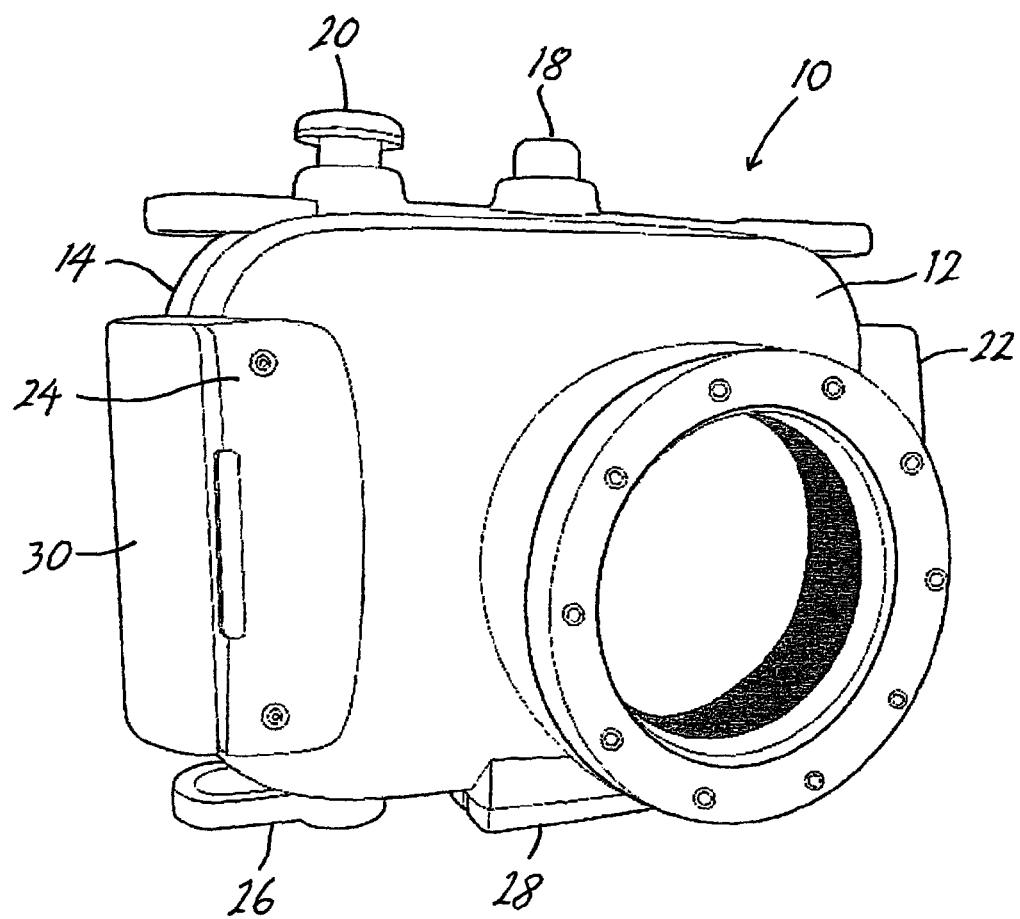
FIG. 1 is a perspective view of a waterproof camera case in a locked position.

FIG. 1 is a perspective view of a waterproof camera case 10. The waterproof camera case 10 can be a user configurable hard protective case suitable for most compact type cameras, especially for digital cameras. The configuration of the waterproof camera case 10 can be changed in order to receive therein different cameras of different sizes and with different locations of shutter button, on/off button and lens of different sizes and locations.

The waterproof camera case 10 may include a front housing or front case member 12, a rear cover or rear case member 14, a hinge 16, an on/off actuator assembly 18, and a shutter actuator assembly 20, a left handle 22, a right handle 24, feet 26, and a heel plate 28.

The front housing 12 can be considered as the main body of the waterproof camera case 10 for receiving a camera therein. The rear cover 14 can be employed to cover the opening of the front housing 12. The coupling edge of the rear cover 14 has to match with the coupling edge of the front housing 12. The rear cover 14 is normally transparent or with a transparent window. It allows a user to load the camera in the camera case 10. The transparent rear cover 14 allows the user to view the object to be photo taken on the camera display on the cameras inside the camera case 10.

One side of the rear cover 14 is provided with the hinge 16 for hingedly connecting to the front housing 12. The front housing 12 and the rear cover 14 may be made of plastic or other suitable materials. A conventional O-ring gasket can be secured in between the coupling edges of the front housing 12 and the rear cover 14 in order to seal the camera case 10 in a waterproof condition.

Figure 2:
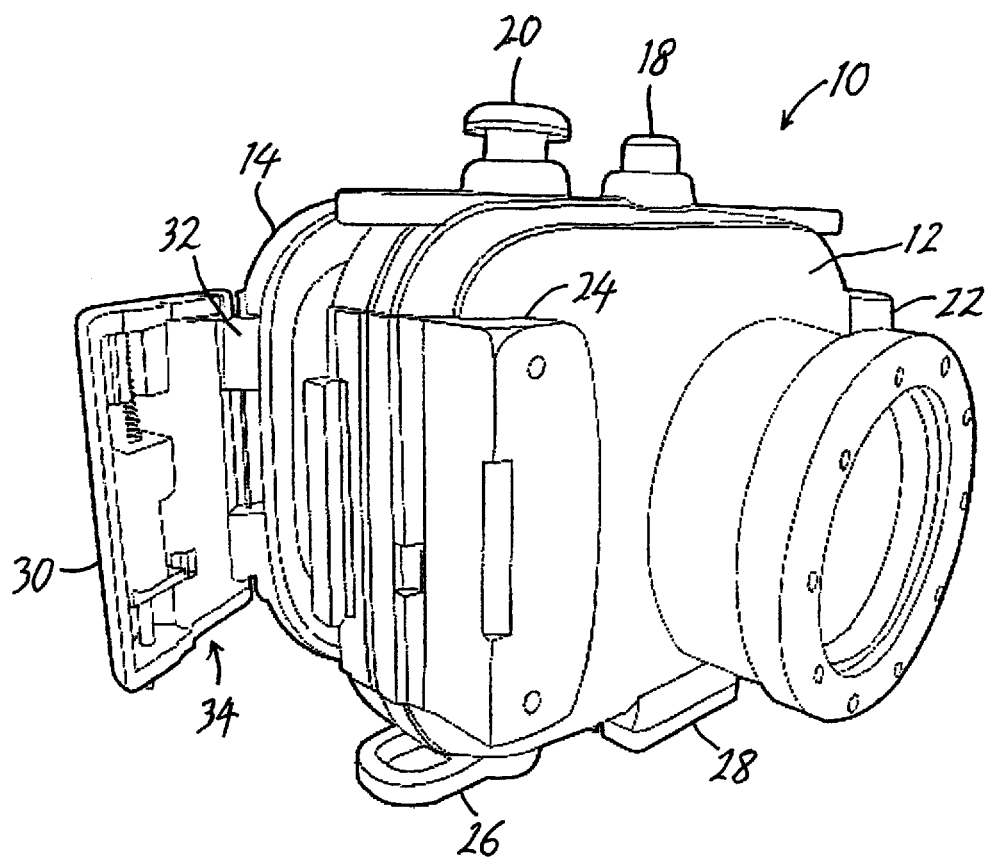
FIG. 2 is a perspective view of the waterproof camera case of FIG. 1 in a partially open position.
Figure 3:
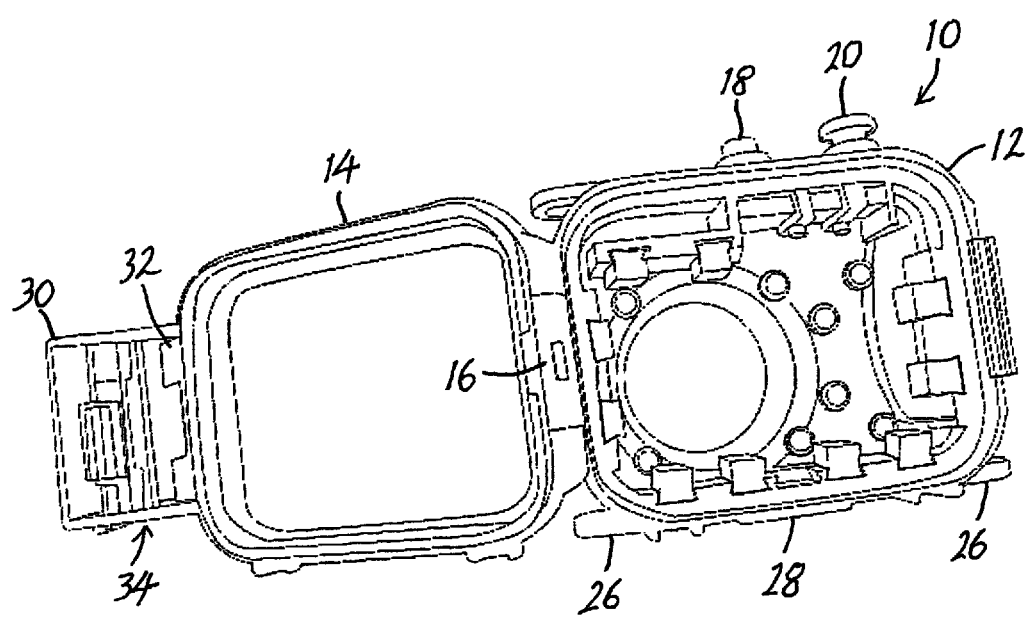
FIG. 3 is a perspective view of the waterproof camera case of FIG. 1 in a fully open position.

FIG. 2 shows the waterproof camera case 10 in a partially open position, and FIG. 3 shows the waterproof camera case 10 in a fully open position. The waterproof camera case 10 includes a side flip 30. The side flip 30 can be hingedly connected to the rear cover 14 by a hinge 32 in such a manner that the side flip 16 can be moveable between a flip open position as shown in FIGS. 2 and 3 and a flip closed position as shown in FIG. 1. The width of the side flip 30 may be substantially equal to the width of the side of the front housing 12.

A lock mechanism, generally designated by reference numeral 34, may be provided on an inner surface 36 of the side flip 30 for locking the front housing 12 and the rear cover 14 together. Details of the lock mechanism 34 will be described hereinbelow.

Figure 4:
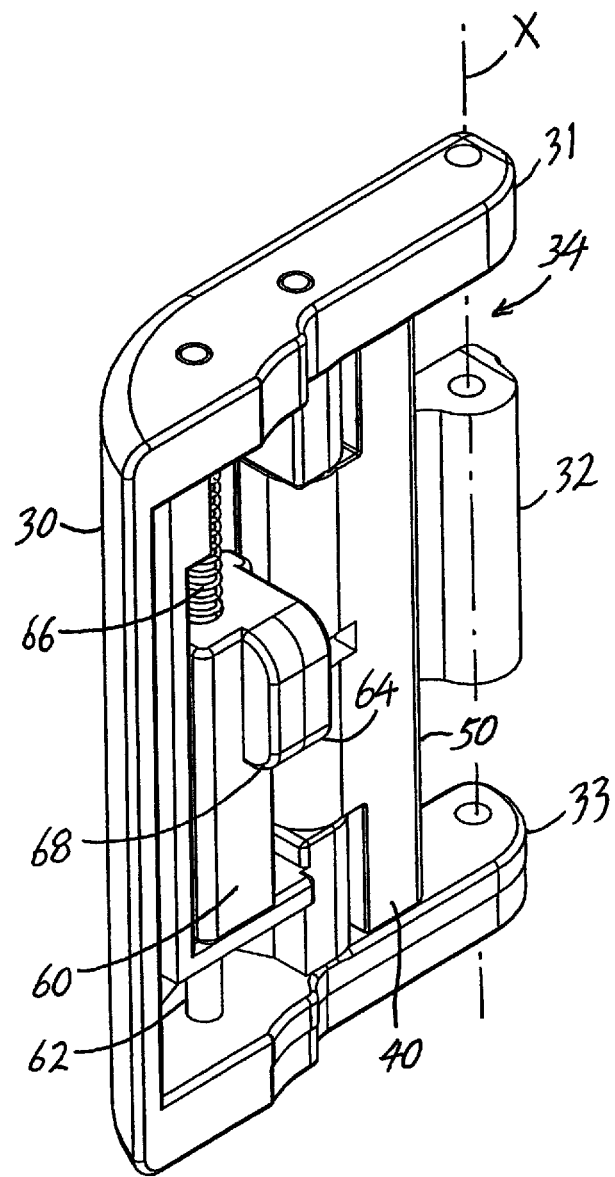
FIG. 4 is a perspective view of a lock mechanism of a waterproof camera case according to an embodiment disclosed in the present application.
Figure 5:
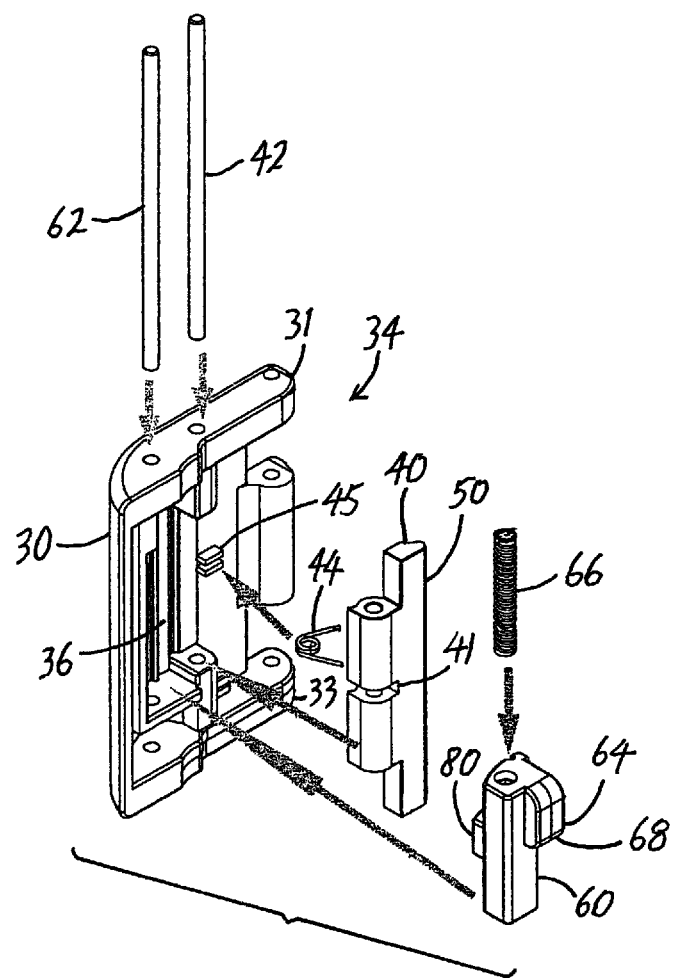
FIG. 5 is an exploded view of the lock mechanism of the waterproof camera case of FIG. 4.
Figure 6:
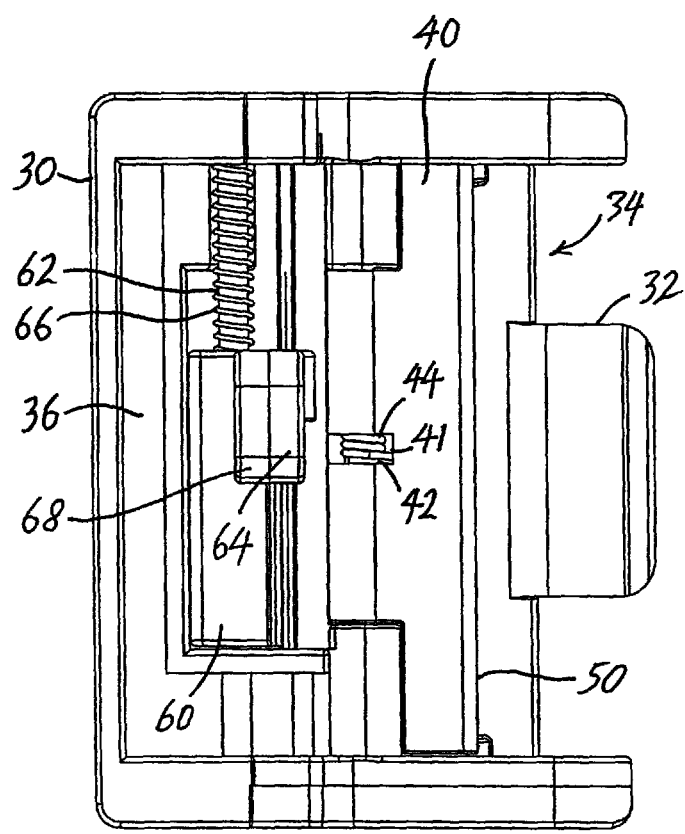
FIG. 6 is a side view of the lock mechanism of the waterproof camera case of FIG. 4.

FIGS. 4, 5 and 6 are the perspective view, exploded view and side view respectively of the lock mechanism 34 of the waterproof camera case 10 according to an embodiment disclosed in the present application.

The lock mechanism 34 may include a press member 40 for pressing the front housing 12 against the rear cover 14 with a sealing gasket in between. According to the illustrated embodiment, the press member 40 may be pivotable about a first shaft 42 mounted on the inner surface 36 of the side flip 30. The first shaft 42 can be parallel to a pivot axis X about which the side flip 30 pivots with respect to the rear cover 14.

Figure 8:
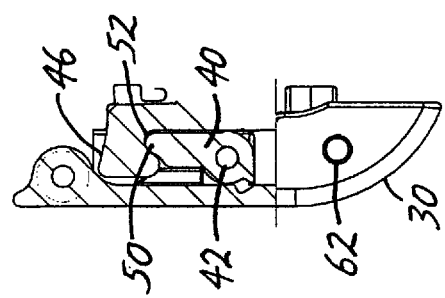
FIG. 8 is a partial cross sectional view showing the engagement of the press member with the camera case in the locked position.

The first shaft 42 can extend from an upper flange portion 31 of the side flip 30 to a lower flange portion 33 of the side flip 30. As shown by the arrow in FIG. 7, the press member 40 can pivot between a non-pressing position as shown by a solid line and a pressing position as shown by a dotted line. In the non-pressing position, the press member 40 is not pressing against the flip-engaging side of the front housing 12. In the pressing position, the press member 40 is pressing against a surface of a ledge 46 oppositely facing the rear cover 14, as best illustrated in FIG. 8.

The ledge 46 may project outwardly from the flip-engaging side the front housing 12. The ledge 46 may be integrally formed proximate to and along an edge of the front housing 12. When a user covers the front housing 12 with the rear cover 14 and flips the side flip 30 from the flip open position to the flip closed position, a free distal edge or side 50 of the press member 40 can press against the surface of the ledge 46 facing away from the rear cover 14.

The size and shape of the press member 40 can be so determined that, when the side flip 30 is in the flip closed position, the press member 40 can apply sufficient force to press the front housing 12 against the rear cover 14 with a conventional O-ring gasket affixed in between so as to effectively seal the coupling edges of the front housing 12 and the rear cover 14 by the sealing gasket.

According to the illustrated embodiment, the press member 40 may be generally in the shape of an elongated rectangular bar. The free distal side 50 of the press member 40 may be elongated in shape and is adapted to engage with an elongated recess 52 formed on the ledge 46 of the front housing 12. The elongated free distal side 50 may have a generally semi-circular or convex cross section and the elongated recess 52 may have a complementary generally semi-circular or concave cross section.

Figure 7:
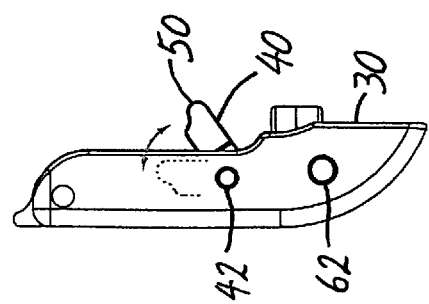
FIG. 7 is a top view of a side flip showing a press member pivotable between a non-pressing position and a pressing position.

The lock mechanism 34 may further include a torsion spring 44. The torsion spring 44 may be provided to bias the press member 40 in the non-pressing position at an acute angle with respect to the side flip 30, as depicted in FIG. 7. When a user flips the side flip 30 from the flip open position to the flip closed position, the press member 40 can pivot towards and abut against the inner surface 36 of the side flip 30. When the side flip 30 is moved from the flip closed position to the flip open position, the press member 40 returns to its non-pressing position as the torsion spring 44 springs back to its normal position thereby biasing the press member 40 in the non-pressing position.

The torsion spring 44 can be disposed within a central slot 41 of the press member 40. The torsion spring 44 has a coiled section and two free ends. The coiled section can be mounted around the first shaft 42. One free end can be held in position by a pair of brackets 45 integrally formed on the inner surface 36 of the side flip 30, and the other free end may be held in position within a groove formed on an inner surface of the press member 40.

Figure 9:
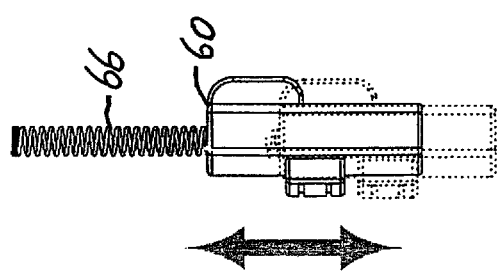
FIG. 9 is a side view showing a lock member moveable between a locked position and an unlocked position.

A lock member 60 may be slidable longitudinally along a second shaft 62 mounted on the inner surface 36 of the side flip 30. As illustrated by the arrow in FIG. 9, the lock member 60 is movable between an unlocked position shown by a solid line and a locked position shown by a dotted line. The lock member 60 can slide upwards to the unlocked position and slide downwards to the locked position. The first shaft 42 and the second shaft 62 may be parallel to each other.

Figure 10:
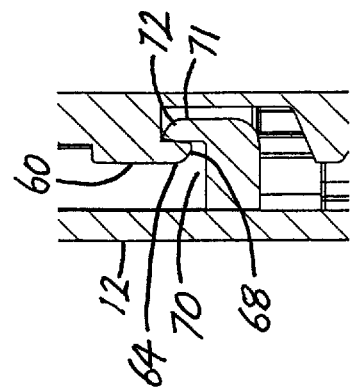
FIG. 10 is a cross sectional view showing the interlocking of the lock member with the front case member of the camera case.

The lock member 60 may include a latch portion 64 adapted to insert into a cavity or slot 70 defined by a catch portion 71 formed integrally on the side of the front housing 12, thereby locking the side flip 30 is in the flip closed position, as depicted in FIG. 10.

A compression spring 66 may be employed to bias the lock member 60 in the locked position. The compression spring 66 can be mounted coaxially around the second shaft 62. The latch portion 64 may have a curved surface 68 for engagement with a cooperating curved surface 72 formed on the catch portion 71 on the side of the front housing 12. When the side flip 30 is moved from the flip open position towards the flip closed position, the curved surface 72 of the catch portion 71 presses against the curved surface 68 of the latch portion 64 thereby forcing the lock member 60 to move upwards towards the unlocked position until the latch portion 64 passes the catch portion 71 and inserted into the slot 70 when the lock member 60 is pushed from the unlocked position downwards to the locked position under the influence of the compression force of the compression spring 66.

A switch portion 80 can be integrally formed on the lock member 60 and extended outwardly through an opening of the side flip 30 for manually switching the lock member 60 from the locked position to the unlocked position when the side flip 30 is in the flip closed position.

Although it has been shown and described that a torsion spring 44 is employed to bias the press member 40 in the non-pressing position and a compression spring 66 is employed to bias the lock member 60 in the locked position, it is understood by one skilled in the art that the lock mechanism may work without the torsion spring 44 and the compression spring 66. For example, the slidable lock member 60 may be slid manually between the locked and unlocked positions where the lock member 60 can be held in position by any conventional snap fasteners.

Although it has been shown and described that the lock mechanism 34 is used for locking a waterproof camera case 10, it is contemplated that the lock mechanism 34 can be used for locking any other cases or the like having case members that may or may not be hingedly connected together. For case members not connected together by a hinge, two or more lock mechanisms 34 may be employed to lock the two opposite sides of the case members respectively.

While the lock mechanism of a waterproof camera case disclosed in the present application has been shown and described with particular references to a number of preferred embodiments thereof, it should be noted that various other changes or modifications may be made without departing from the scope of the appending claims.

What is claimed is:

1. A waterproof camera case comprising first and second case members and a lock mechanism for locking the first and second case members together, the lock mechanism comprising:
   (a) a side flip hingedly connected to a side of the first case member and moveable between a flip open position and a flip closed position where an inner surface of the side flip abuts against a side of the second case member;
   (b) a press member pivotable about a first shaft mounted on the inner surface of the side flip and moveable between a non-pressing position and a pressing position, a free distal side of the press member pressed against a ledge projected from the side of the second case member on a surface oppositely facing first case member; and
   (c) a lock member slidable along a second shaft mounted on the inner surface of the side flip and moveable between an unlocked position and a locked position, the lock member comprising a latch portion inserted into a cavity defined by a catch portion formed on the side of the second case member;
   a torsion spring coupled to the first shaft for biasing the press member in the non-pressing position at an acute angle with respect to the side flip;
   wherein the ledge is projects outwardly from a flip-engaging side of the first case member, the ledge is integrally formed proximate to and along an edge of the first case member; when the first case member covers the second case member and flips the side flip from the flip open position to the flip closed position, a free distal edge or side of the press member press against the surface of the ledge facing away from the second case member;
   wherein when a user flips the side flip from the flip open position to the flip closed position, the press member pivots towards and abuts against the inner surface of the side flip; wherein when the side flip is moved from the flip closed position to the flip open position, the press member returns to its non-pressing position as the torsion spring springs back to its normal position thereby biasing the press member in the non-pressing position; wherein the torsion spring is disposed within a central slot of the press member; the torsion spring has a coiled section and two free ends; the coiled section is mounted around the first shaft; one free end is held in position by a pair of brackets integrally formed on the inner surface of the side flip, and the other free end is held in position within a groove formed on an inner surface of the press member.

2. The waterproof camera case as claimed in claim 1, further comprising a compression spring mounted on the second shaft for biasing the lock member in the locked position.

3. The waterproof camera case as claimed in claim 1, wherein the press member is generally in the shape of an elongated rectangular bar, and the free distal side of the press member is elongated in shape for pressing against an elongated groove formed on the ledge.

4. The waterproof camera case as claimed in claim 3, wherein the elongated free distal side has a convex cross section, and the elongated groove has a complementary concave cross section.

5. The waterproof camera case as claimed in claim 1, wherein the latch portion has a first curved surface for engagement with a second curved surface on the catch portion, whereby when the side flip is moved from the flip open position towards the flip closed position, the first curved surface presses against the second curved surface thereby forcing the lock member to move towards the unlocked position until the latch portion passes the catch portion and inserts into the cavity when the lock member is pushed from the unlocked position to the locked position under the influence of the compression force of the compression spring.

6. The waterproof camera case as claimed in claim 1, further comprising a switch portion integrally formed on the lock member and disposed generally through an opening of the side flip for manually switching the lock member from the locked position to the unlocked position thereby releasing the side flip from the flip closed position.

7. The waterproof camera case as claimed in claim 1, wherein the first shaft is parallel to a pivot axis about which the side flip pivots with respect to the first case member.

8. The waterproof camera case as claimed in claim 1, wherein the first and second shafts are parallel to each other.

9. The waterproof camera case as claimed in claim 1, wherein the side flip is hingedly connected to one side of the first case member opposite to the side of the first case member which is hingedly connected to the second case member.

10. The waterproof camera case as claimed in claim 1, wherein the width of the side flip is substantially equal to the width of the side of the second case member.

* * * * *